United States Patent
Meng et al.

(10) Patent No.: US 10,884,282 B1
(45) Date of Patent: Jan. 5, 2021

(54) TRANSPARENT DISPLAY DEVICE, METHOD OF MANUFACTURING THE SAME, AND METHOD OF CONTROLLING THE SAME

(71) Applicant: BOE Technology Group Co., Ltd., Beijing (CN)

(72) Inventors: Xiandong Meng, Beijing (CN); Jifeng Tan, Beijing (CN); Wei Wang, Beijing (CN); Qiuyu Ling, Beijing (CN); Xianqin Meng, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/887,365

(22) Filed: May 29, 2020

(30) Foreign Application Priority Data

Oct. 23, 2019 (CN) .......................... 2019 1 1008974

(51) Int. Cl.
G02F 1/1335 (2006.01)
G02F 1/13357 (2006.01)
G02F 1/017 (2006.01)
F21V 8/00 (2006.01)

(52) U.S. Cl.
CPC ..... *G02F 1/133512* (2013.01); *G02B 6/0015* (2013.01); *G02F 1/017* (2013.01); *G02F 1/1336* (2013.01); *G02F 1/133516* (2013.01); *G02F 2001/01791* (2013.01); *G02F 2001/133614* (2013.01); *G02F 2201/121* (2013.01); *G02F 2201/30* (2013.01); *G02F 2203/30* (2013.01)

(58) Field of Classification Search
CPC ......... G02F 1/133512; G02F 1/133516; G02F 1/017; G02F 1/1336; G02F 2201/30; G02F 2203/30; G02F 2001/01791; G02F 2201/121; G02F 2001/133614; G02B 6/0015
See application file for complete search history.

(56) References Cited

U.S. PATENT DOCUMENTS

| | | | | |
|---|---|---|---|---|
| 2011/0141395 A1* | 6/2011 | Yashiro | ................ | G02B 6/0036 349/62 |
| 2014/0300960 A1* | 10/2014 | Santori | .............. | G02B 27/4205 359/462 |
| 2015/0219914 A1* | 8/2015 | Dong | ................ | G02F 1/133528 349/15 |
| 2017/0276928 A1* | 9/2017 | Sakai | ..................... | G02B 5/201 |

* cited by examiner

*Primary Examiner* — Phu Vu
(74) *Attorney, Agent, or Firm* — Nath, Goldberg & Meyer; Joshua B. Goldberg

(57) ABSTRACT

Transparent display device, manufacturing method and controlling method thereof are provided. The transparent display device includes a light guide plate with a rectangular light exit, and a liquid crystal unit including multiple strip electrodes arranged in parallel and a black matrix; the black matrix includes a first and second strip-shaped light-shielding layers; an arrangement direction of the multiple strip electrodes is not parallel to any edge of the light exit; an orthographic projection of the first strip-shaped light-shielding layer on the light guide plate covers at least a center of the light exit and an extension direction of which is parallel to a first edge of the light exit, and an orthographic projection of the second strip-shaped light-shielding layer on the light guide plate covers at least the center of the light exit and an extension direction of which is parallel to another edge perpendicular to the first edge.

20 Claims, 4 Drawing Sheets

TRANSPARENT DISPLAY DEVICE, METHOD OF MANUFACTURING THE SAME, AND METHOD OF CONTROLLING THE SAME

CROSS-REFERENCE OF RELATED APPLICATIONS

The present application claims the priority to Chinese Patent Application No. 201911008974.3 and filed with the Chinese Patent Office on Oct. 23, 2019, which is hereby incorporated by reference in its entirety.

TECHNICAL FIELD

The present disclosure belongs to the field of display technology, and particularly relates to a transparent display device, a method of manufacturing the same, and a method of controlling the same.

BACKGROUND

Since a transparent display device has a certain light transmittance, a user can see objects behind it through the transparent display device while viewing a display screen. Current transparent display devices usually display based on liquid crystal molecules. Therefore, a transparent display device based on liquid crystal molecules usually needs to have a sealed liquid crystal box, and a structure such as a polarizer. That is to say, the above-mentioned transparent display device is not completely transparent, but has a certain transmittance to ambient light, so that the user can observe objects behind the display device.

The current transparent display device, and manufacturing method and controlling method thereof still need to be improved.

SUMMARY

According to an aspect of an embodiment of the present disclosure, provided is a transparent display device, including a light guide plate and a liquid crystal unit close to a light outgoing side of the light guide plate. The light outgoing side of the light guide plate has at least one rectangular light exit, the at least one light exit is respectively provided with a light extraction grating, and the light extraction grating is configured to extract light in the light guide plate; and the liquid crystal unit includes an electrode layer for controlling liquid crystal molecules in a liquid crystal layer to form a liquid crystal grating, and a black matrix on a side of the liquid crystal layer away from the light guide plate; where the electrode layer includes a plurality of strip electrodes arranged in parallel, and the black matrix includes at least one first strip-shaped light-shielding layer extending in a first direction and at least one second strip-shaped light-shielding layer extending in a second direction; where for one light exit of the at least one light exit, an arrangement direction of the plurality of strip electrodes is not parallel to a first rectangle edge of the light exit and not parallel to a second rectangle edge of the light exit, where the first rectangle edge and the second rectangle edge are perpendicular to each other; and an extension direction of an orthographic projection of one of the at least one first strip-shaped light-shielding layer on the light guide plate is parallel to the first rectangle edge and the orthographic projection of the first strip-shaped light-shielding layer on the light guide plate covers at least a center of the light exit, and an extension direction of an orthographic projection of one of the at least one second strip-shaped light-shielding layer on the light guide plate is parallel to the second rectangle edge and the orthographic projection of the second strip-shaped light-shielding layer on the light guide plate covers at least the center of the light exit.

In a possible embodiment, a width of the first strip-shaped light-shielding layer in the second direction is greater than or equal to a set first threshold, and less than or equal to a set second threshold; where the set first threshold is less than or equal to a length of the second rectangle edge, and the set second threshold is greater than or equal to the length of the second rectangle edge; and/or a width of the second strip-shaped light-shielding layer in the first direction is greater than or equal to a set third threshold, and less than or equal to a set fourth threshold; where the set third threshold is less than or equal to a length of the first rectangle edge, and the set fourth threshold is greater than or equal to the length of the first rectangle edge; and/or a length of the first strip-shaped light-shielding layer in the first direction is greater than or equal to the length of the first rectangle edge; and/or a length of the second strip-shaped light-shielding layer in the second direction is greater than or equal to the length of the second rectangle edge.

In a possible embodiment, the first strip-shaped light-shielding layer overlaps with the second strip-shaped light-shielding layer, and an orthographic projection on the light guide plate of an overlapping area of the first strip-shaped light-shielding layer and the second strip-shaped light-shielding layer coincides with an orthographic projection of the light exit on the light guide plate.

In a possible embodiment, the light exit is square, and the arrangement direction of the plurality of strip electrodes is parallel or perpendicular to an angle bisector between the first rectangle edge and the second rectangle edge.

In a possible embodiment, the electrode layer further includes a common electrode, where the common electrode and the plurality of strip electrodes are on a side of the liquid crystal layer close to the light guide plate, and the common electrode is on a side of the plurality of strip electrodes close to the light guide plate.

In a possible embodiment, a substrate on a side of the liquid crystal unit away from the light guide plate has a color film layer, and the black matrix and a pixel black matrix are on the color film layer.

In a possible embodiment, the pixel black matrix includes a plurality of third strip-shaped light-shielding layers extending in the first direction and a plurality of fourth strip-shaped light-shielding layers extending in the second direction; where any two adjacent third strip-shaped light-shielding layers in the plurality of third strip-shaped light-shielding layers and any two adjacent fourth strip-shaped light-shielding layers in the plurality of fourth strip-shaped light-shielding layers encompass an enclosed area as a sub-pixel area, to form a plurality of sub-pixel areas; each sub-pixel area of the plurality of sub-pixel areas includes a rectangular display area, and a transparent area other than the display area; and the at least one light exit is respectively located in ranges of orthographic projections of respective display areas on the light guide plate.

In a possible embodiment, the transparent display device further includes a light source, where the light source is a side-entry light source.

In a possible embodiment, the light source includes a plurality of monochromatic light sources configured to realize color display of the transparent display device through timing control.

In a possible embodiment, the light source includes a blue light source, and the color film layer has a plurality of quantum dot color blocks that can be excited by the blue light source, and colors of the plurality of quantum dot color blocks are not completely a same.

In a possible embodiment, the transparent display device further includes a collimating lampshade configured such that light emitted by the light source enters the light guide plate at a set incident angle, where the set incident angle makes the light emitted by the light source totally reflected in the light guide plate.

In a possible embodiment, the transparent display device further includes a low-refractive layer covering a surface of the light guide plate having the at least one light exit.

According to another aspect of an embodiment of the present disclosure, provided is a method of manufacturing a transparent display device, including forming a light guide plate; where a light outgoing side of the light guide plate has at least one rectangular light exit, the at least one light exit is respectively provided with a light extraction grating, and the light extraction grating is configured to extract light in the light guide plate; and forming a liquid crystal unit on the light outgoing side of the light guide plate; where the liquid crystal unit includes an electrode layer for controlling liquid crystal molecules in a liquid crystal layer to form a liquid crystal grating, and a black matrix on a side of the liquid crystal layer away from the light guide plate; where the electrode layer includes a plurality of strip electrodes arranged in parallel, and the black matrix includes at least one first strip-shaped light-shielding layer extending in a first direction and at least one second strip-shaped light-shielding layer extending in a second direction; for one light exit of the at least one light exit, an arrangement direction of the plurality of strip electrodes is not parallel to a first rectangle edge of the light exit and not parallel to a second rectangle edge of the light exit, where the first rectangle edge and the second rectangle edge are perpendicular to each other; and an extension direction of an orthographic projection of one of the at least one first strip-shaped light-shielding layer on the light guide plate is parallel to the first rectangle edge and the orthographic projection of the first strip-shaped light-shielding layer on the light guide plate covers at least a center of the light exit, and an extension direction of an orthographic projection of one of the at least one second strip-shaped light-shielding layer on the light guide plate is parallel to the second rectangle edge and the orthographic projection of the second strip-shaped light-shielding layer on the light guide plate covers at least the center of the light exit.

In a possible embodiment, a width of the first strip-shaped light-shielding layer in the second direction is greater than or equal to a set first threshold, and less than or equal to a set second threshold; where the set first threshold is less than or equal to a length of the second rectangle edge, and the set second threshold is greater than or equal to the length of the second rectangle edge; and/or a width of the second strip-shaped light-shielding layer in the first direction is greater than or equal to a set third threshold, and less than or equal to a set fourth threshold; where the set third threshold is less than or equal to a length of the first rectangle edge, and the set fourth threshold is greater than or equal to the length of the first rectangle edge; and/or a length of the first strip-shaped light-shielding layer in the first direction is greater than or equal to the length of the first rectangle edge; and/or a length of the second strip-shaped light-shielding layer in the second direction is greater than or equal to the length of the second rectangle edge.

In a possible embodiment, the first strip-shaped light-shielding layer overlaps with the second strip-shaped light-shielding layer, and an orthographic projection on the light guide plate of an overlapping area of the first strip-shaped light-shielding layer and the second strip-shaped light-shielding layer coincides with an orthographic projection of the light exit on the light guide plate.

In a possible embodiment, the light exit is square, and the arrangement direction of the plurality of strip electrodes is parallel or perpendicular to an angle bisector between the first rectangle edge and the second rectangle edge.

In a possible embodiment, forming the liquid crystal unit on the light outgoing side of the light guide plate includes: forming the electrode layer on the light outgoing side of the light guide plate, where the electrode layer further includes a common electrode, and the common electrode is on a side of the plurality of strip electrodes close to the light guide plate; forming the liquid crystal layer on a side of the electrode layer away from the light guide plate; forming a substrate on a side of the liquid crystal layer away from the light guide plate; and forming the black matrix on the substrate via a patterning process.

In a possible embodiment, forming the electrode layer on the light outgoing side of the light guide plate includes: forming the common electrode on the light outgoing side of the light guide plate; and depositing a transparent conductive material on a side of the common electrode away from the light guide plate, and etching the transparent conductive material to form the plurality of strip electrodes.

In a possible embodiment, forming the liquid crystal unit on the light outgoing side of the light guide plate includes: forming a pixel black matrix on the substrate via a patterning process; where the pixel black matrix includes a plurality of third strip-shaped light-shielding layers extending in the first direction and a plurality of fourth strip-shaped light-shielding layers extending in the second direction; where any two adjacent third strip-shaped light-shielding layers in the plurality of third strip-shaped light-shielding layers and any two adjacent fourth strip-shaped light-shielding layers in the plurality of fourth strip-shaped light-shielding layers encompass an enclosed area as a sub-pixel area, to form a plurality of sub-pixel areas; each sub-pixel area of the plurality of sub-pixel areas includes a rectangular display area, and a transparent area other than the display area; and the at least one light exit is respectively located in ranges of orthographic projections of respective display areas on the light guide plate.

According to yet another aspect of an embodiment of the present disclosure, provided is a method of controlling the above-mentioned transparent display device, including determining a gray scale state according to a picture to be displayed, where the gray scale state includes a darkest state L0 and a brightest state Ln; and supplying a set voltage to the plurality of strip electrodes, in response to determining that the gray scale state is the Ln, so that the liquid crystal molecules in the liquid crystal layer form the liquid crystal grating, and an arrangement direction of stripes of the liquid crystal grating is not parallel to the first rectangle edge of the light exit and not parallel to the second rectangle edge of the light exit; supplying no voltage to the plurality of strip electrodes, in response to determining that the gray scale state is the L0.

DETAILED DESCRIPTION OF THE EMBODIMENTS

Figure 1:
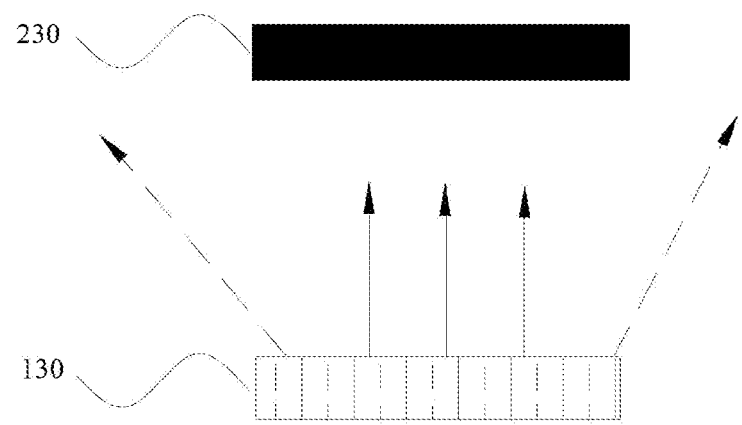
FIG. 1 is a schematic diagram of a partial structure of a related-art transparent display device.

The embodiments of the present disclosure are described in detail below, and examples of the embodiments are shown in the drawings, in which the same or similar reference numerals indicate the same or similar elements or elements having the same or similar functions throughout. The embodiments described below with reference to the drawings are exemplary, and are only used to explain the present disclosure, and cannot be construed as limiting the present disclosure.

If a related-art transparent display device has a polarizer, the transmittance of the display device to ambient light will be greatly reduced. If an optical structure such as a grating is used at a light exit of a backlight unit, and at the same time to avoid the use of polarizers in the display device, although the transmittance of the device to ambient light can be improved, the display device of this structure also has the following problems. The related-art transparent display device has the light exit at a specific position of the light guide plate, and a light extraction grating is provided at the light exit. However, due to a small size of the light exit, the light emitted from the light guide plate will be scattered to some extent. As a result, light leakage occurs in a dark state (i.e., when the gray scale state is L0), thereby reducing a contrast ratio (CR) of the device.

In order to facilitate understanding, the following first briefly explains the causes of light leakage in the dark state of the related-art transparent display device. As shown in FIG. 1, it is a schematic diagram of a partial structure of the related-art transparent display device. Each light exit is provided with a light extraction grating 130 to achieve collimated light extraction (FIG. 1 shows one light extraction grating 130 as an example, and the light exit is not shown in FIG. 1), and a black matrix 230 is provided directly above the light exit. Therefore, in the dark state display, the black matrix 230 can block the collimated straight backlight; while in the bright state display, the collimated backlight diffracts after passing through a liquid crystal grating (not shown in FIG. 1), and light with higher energy can be emitted from sides of the black matrix 230. However, due to the small size of the light exit, a certain degree of small hole diffraction will occur when the backlight passes through the light exit; therefore, in the dark state display, the black matrix 230 can only block the emission of the 0th order light rays with a large energy and in the center of the small hole diffraction, and the light of other orders will still be emitted from sides of the black matrix 230 (as shown by the dotted arrow in FIG. 1), thereby causing the light leakage in the dark state.

Figure 2:
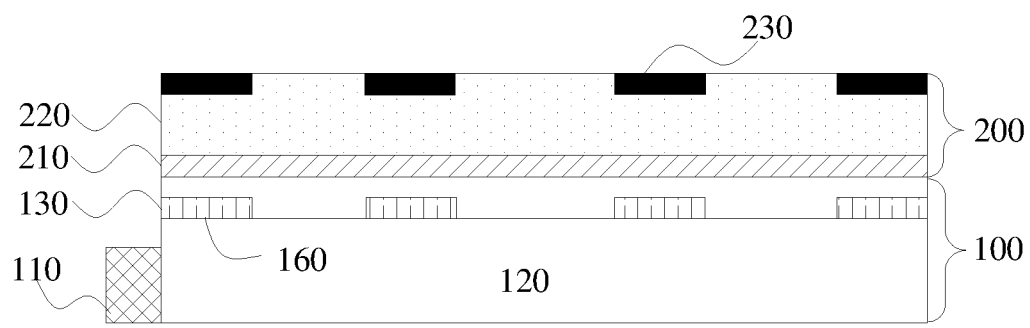
FIG. 2 is a schematic structural diagram of a transparent display device provided according to an embodiment of the present disclosure.

In order to solve the above-mentioned problem of light leakage in the dark state, an embodiment of the present disclosure provides a transparent display device. As shown in FIG. 2, it is a schematic structural diagram of the transparent display device provided according to the embodiment of the present disclosure. The transparent display device may include a backlight unit 100 and a liquid crystal unit 200. The backlight unit 100 has a light source 110 and a light guide plate 120, and a light outgoing side of the light guide plate 120 has at least one rectangular light exit 160 (referring to FIG. 3). Each of the at least one light exit 160 is provided with a light extraction grating 130, the light extraction grating 130 may be configured to extract the light totally reflected in the light guide plate 120, and a vector direction of the light extraction grating 130 is parallel to a rectangle edge of the corresponding light exit 160. This structure enables the backlight unit 100 to achieve collimated light extraction, and to cooperate with an electrode layer 210 in the liquid crystal unit 200 to achieve gray-scale display. The liquid crystal unit 200 is located on a light outgoing side of the backlight unit 100. The liquid crystal unit 200 has a liquid crystal layer 220 sealed in an enclosed space, an electrode layer 210 for controlling liquid crystal molecules in the liquid crystal layer 220 to form the liquid crystal grating, and a black matrix 230. The black matrix 230 may be configured to block light diffracted by small holes at respective light exits 160. The electrode layer 210 may include a first electrode and a second electrode which are used for forming an electric field for controlling liquid crystal molecules. The first electrode may be a pixel electrode, and the pixel electrode may include a plurality of strip electrodes arranged in parallel (not shown in FIG. 2), where an angle between an arrangement direction of the plurality of strip electrodes and a rectangle edge of the light exit 160 is greater than 0 degree and less than 90 degrees. The second electrode may be a common electrode, and the common electrode may be a surface electrode.

The transparent display device provided according to embodiments of the present disclosure can ensure a high ambient light transmittance while alleviating the problem of light leakage in the dark state, thereby improving a contrast ratio for display.

According to an embodiment of the present disclosure, the black matrix 230 may include two strip-shaped light-shielding layers that overlap each other, and an orthographic projection of an overlapping area of the two strip-shaped light-shielding layers on the light guide plate 120 coincides with an orthographic projection of the light extraction grating 130 on the light plate 120; therefore, the overlapping area of the two strip-shaped light-shielding layers may be used for blocking the center 0th order light rays emitted from the light-grating grating 130, and two extended strip-shaped light-shielding layers may be used for blocking other orders light rays, which can alleviate the problem of light leakage in the dark state. At the same time, there is a certain angle between the arrangement direction of the plurality of strip electrodes used for controlling the liquid crystal grating and a rectangle edge of the rectangular light exit 160. Therefore, in the bright state, an arrangement direction of the liquid crystal grating can be adjusted, so that light emitted through the liquid crystal grating can be emitted from areas unblocked by the black matrix 230. In other words, this structure makes a direction of the light extracted in the bright state not coincide with a direction of light leakage of the small hole diffraction in the dark state, but has a certain angle with the direction of light leakage of the small hole diffraction, and thus the display in the bright state can be achieved while blocking the light leakage of the small hole diffraction in the dark state.

Figure 3:
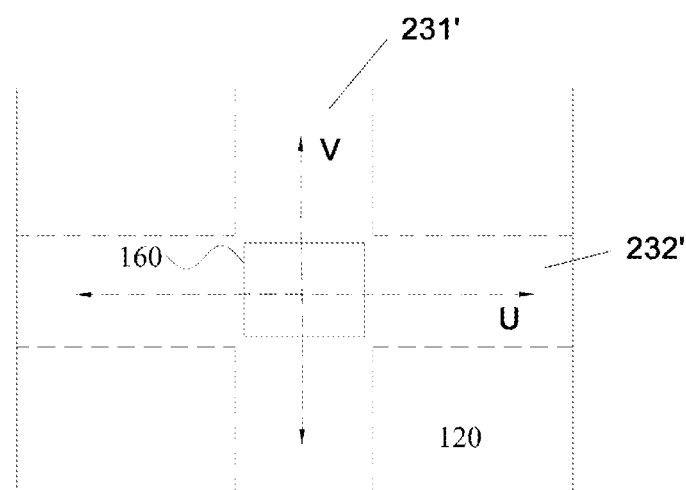
FIG. 3 is a schematic diagram of a partial structure of the transparent display device provided according to an embodiment of the present disclosure.
Figure 4:
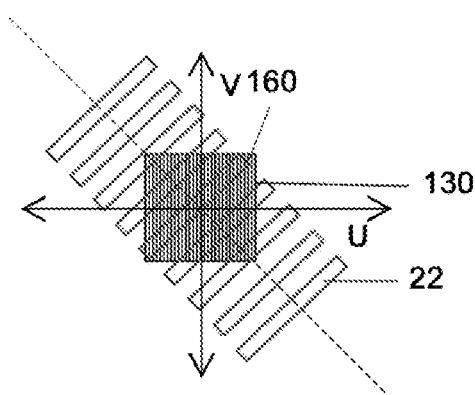
FIG. 4 is another schematic diagram of a partial structure of the transparent display device provided according to an embodiment of the present disclosure.
Figure 5:
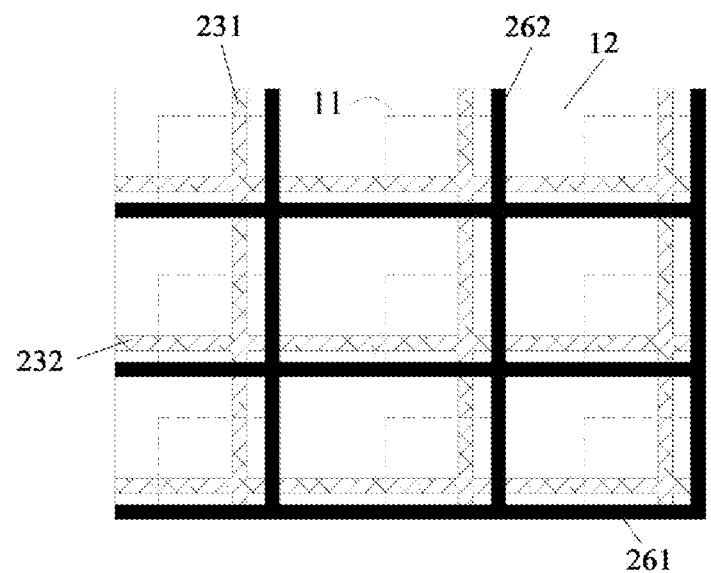
FIG. 5 is yet another schematic diagram of a partial structure of the transparent display device provided according to an embodiment of the present disclosure.

According to an embodiment of the present disclosure, as shown in FIGS. 3-5, they are schematic diagrams of a partial structure of the transparent display device provided according to an embodiment of the present disclosure. Suppose that a U-axis is configured to parallel to a first rectangle edge of the light exit 160 (the first rectangle edge extends in a first direction), and a V-axis is configured to parallel to a second rectangle edge of the light exit 160 (the second rectangle edge extends in a second direction), and the intersection of the U-axis and the V-axis coincides with the center of the light exit 160. The black matrix 230 may include at least one first strip-shaped light-shielding layer 232 extending in the first direction and at least one second strip-shaped light-shielding layer 231 extending in the second direction. There is an overlapping area between the first strip-shaped light-shielding layer 232 and the second strip-shaped light-shielding layer 231, and an orthographic projection 232' of the first strip-shaped light-shielding layer 232 on the backlight unit 100 at least covers the U-axis of the light exit 160, and an orthographic projection 231' of the second strip-shaped light-shielding layer 231 on the backlight unit 100 at least covers the V-axis of the light exit 160. A length of the first strip-shaped light-shielding layer 232 in the first direction is greater than or equal to a length of the first rectangle edge; and/or a length of the second strip-shaped light-shielding layer 231 in the second direction is greater than or equal to a length of the second rectangle edge. Therefore, in the dark state display, a small part of the light rays diffracted by the small hole among the light rays emitted from the light extraction grating 130 (the light emitting directions are shown by the U-axis and the V-axis in FIG. 3) can be blocked by the first strip-shaped light-shielding layer 232 and the second strip-shaped light-shielding layer 231, and the center 0th order light rays can be blocked by the overlapping area of the first strip-shaped light-shielding layer 232 and the second strip-shaped light-shielding layer 231, thereby avoiding the problem of light leakage in the dark state (i.e., when the gray scale state is L0). As shown in FIG. 4, the arrangement direction of the plurality of strip electrodes 22 is not parallel to the U-axis of the light exit 160 and not parallel to the V-axis of the light exit 160. Therefore, in the bright state, the arrangement direction of the liquid crystal grating can be adjusted, so that the light emitted through the liquid crystal grating can be emitted from areas unblocked by the black matrix 230.

According to an embodiment of the present disclosure, when the light exit 160 is square, an acute angle α between the arrangement direction of the plurality of strip electrodes 22 and the first rectangle edge (U-axis in FIG. 4) may be 45 degrees.

According to an embodiment of the present disclosure, the first strip-shaped light-shielding layer 232 extends in the first direction, the second strip-shaped light-shielding layer 231 extends in the second direction, the first direction is parallel to the first rectangle edge of the rectangular light exit 160, the second direction is parallel to the second rectangle edge of the light exit 160, and the first rectangle edge and the second rectangle edge are perpendicular to each other. A width of the first strip-shaped light-shielding layer 232 in the second direction is greater than or equal to a set first threshold, and less than or equal to a set second threshold; where the set first threshold is less than or equal to the length of the second rectangle edge, and the set second threshold is greater than or equal to the length of the second rectangle edge; and/or a width of the second strip-shaped light-shielding layer 231 in the first direction is greater than or equal to a set third threshold, and less than or equal to a set fourth threshold; where the set third threshold is less than or equal to the length of the first rectangle edge, and the set fourth threshold is greater than or equal to the length of the first rectangle edge.

That is to say, if the blocking area of the black matrix 230 is too large, it is not conducive to the display of the display device in the bright state (i.e., the bright state display); otherwise, it is not conducive to the display of the display device in the dark state (i.e., the dark state display). Therefore, in order to achieve the best balance between the dark state display and the bright state display, the width of the first strip-shaped light-shielding layer 232 in the second direction and the width of the second strip-shaped light-shielding layer 231 in the first direction may be set flexibly, according to respective influencing elements such as wavelengths of the emitted light rays or the length of the rectangle edge of the light exit, which are not limited in the embodiments of the present disclosure. For example, the width of the first strip-shaped light-shielding layer 232 in the second direction is set to be slightly larger than the length of the second rectangle edge, and the width of the second strip-shaped light-shielding layer 231 in the first direction is set to be slightly larger than the length of the first rectangle edge; and thus, the diffracted light rays of the small hole can be blocked more fully, and the bright state display is not excessively affected.

According to an embodiment of the present disclosure, as shown in FIG. 5, the at least one light exit 160 may be a plurality of light exits 160 (not shown in FIG. 5) arranged in the first direction and the second direction. The at least one first strip-shaped light-shielding layer 232 may be a plurality of first strip-shaped light-shielding layers 232 arranged in parallel in the second direction; and the at least one second strip-shaped light-shielding layer 231 may be a plurality of second strip-shaped light-shielding layers 231 arranged in parallel in the first direction.

According to an embodiment of the present disclosure, the light exit 160 may be rectangular. The light extraction grating 130 is provided at the light exit 160 for collimating and diffracting the light emitted from the light exit 160. The orthographic projection of the light extraction grating 130 on the light guide plate 120 may coincide with an area where the light exit 160 is located; that is, the light extraction grating 130 may also be rectangular. Since the light emitted from the light exit 160 passes through the light extraction grating 130, in order to facilitate understanding, the following describes a position of the light exit 160 with the light extraction grating 130 instead.

Figure 6:
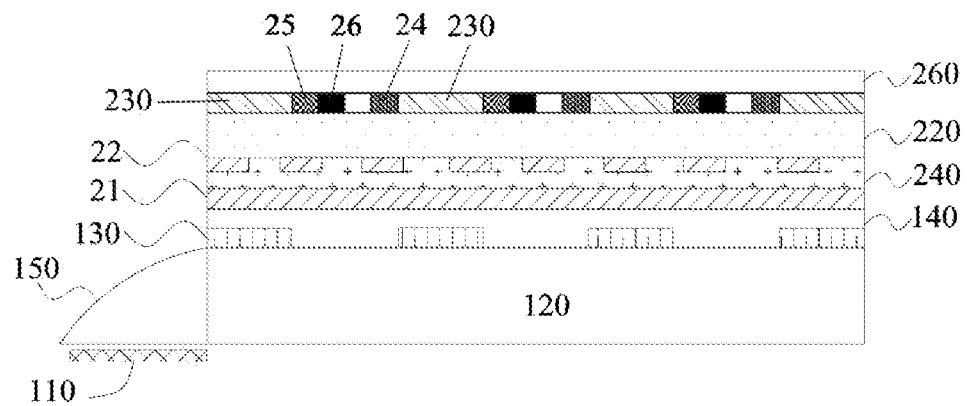
FIG. 6 is another schematic structural diagram of the transparent display device provided according to an embodiment of the present disclosure.

According to an embodiment of the present disclosure, the specific position and shape of the electrode layer 210 are not particularly limited, as long as the electrode layer 210 can be used for forming an electric field that can deflect liquid crystal molecules to form a liquid crystal grating. For example, two electrodes in the electrode layer 210 may be located on a same side of the liquid crystal layer 220. Specifically, as shown in FIG. 6, which is another schematic structural diagram of the transparent display device provided according to an embodiment of the present disclosure, the electrode layer 210 may include a common electrode 21 and a pixel electrode (i.e., a plurality of strip electrodes 22). The common electrode 21 and the pixel electrode are located on the same side of the liquid crystal layer 220 and are separated by an insulating layer 240, and the common electrode 21 is disposed close to the light guide plate 120.

According to an embodiment of the present disclosure, in order to further improve the transmittance of the display device itself and the transmittance to the ambient light, a transparent conductive material can be selected to form the common electrode 21 and the pixel electrode. For example, Indium Tin Oxide (ITO) may be used to form the pixel electrode.

According to an embodiment of the present disclosure, the light source 110 of the transparent display device may be a side-entry light source. The backlight unit 100 may further include a collimating lampshade 150, so that the light of the light source 110 can be incident into the light guide plate 120 at an angle that makes the light totally reflected in the light guide plate 120.

According to an embodiment of the present disclosure, since the light extraction grating 130 is provided at the light exit 160, a low-refractive layer 140 may be formed on a side of the light extraction grating 130 away from the light guide plate 120 by using a low-refractive adhesive or other materials. As a result, on the one hand, a convex portion at a top of the grating can be flattened; and on the other hand, the light-locking ability of the waveguide in the non-light exit area can be ensured. The refractive index of the low-refractive adhesive used in the low-refractive layer 140 may be 1.2-1.3, and thus performance of the backlight unit 100 may be further improved.

According to an embodiment of the present disclosure, the liquid crystal layer 220 (i.e., liquid crystal molecules) in the liquid crystal unit 200 needs to be sealed in a closed space. Therefore, it is required that the liquid crystal unit 200 may have two substrates arranged opposite to each other to seal the liquid crystal molecules. For example, the light guide plate 120 may be used as one substrate of the liquid crystal unit 200, and a color filter substrate 260 is provided on the other side of the liquid crystal unit 200. Alternatively, the liquid crystal unit 200 may also include the color filter substrate 260 and another substrate disposed separately (not shown in the drawings), to seal the liquid crystal molecules.

According to an embodiment of the present disclosure, the black matrix 230 may be disposed on the color filter substrate 260, and may be specifically located on a side of the color filter substrate 260 facing the liquid crystal layer 220.

Figure 7:
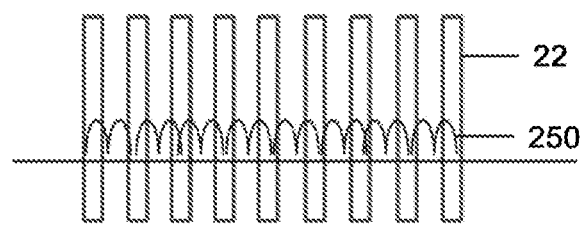
FIG. 7 is a schematic structural diagram of a pixel electrode and a formed liquid crystal grating of the transparent display device provided according to an embodiment of the present disclosure.
Figure 8:
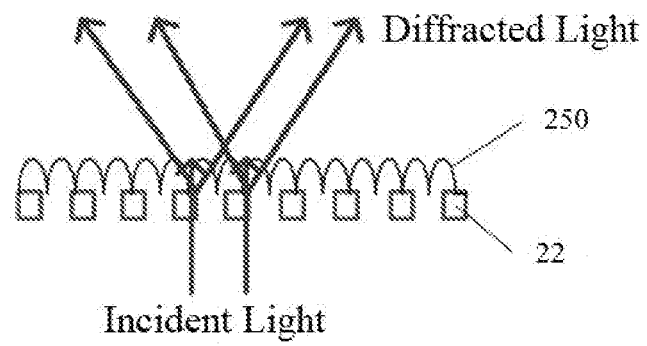
FIG. 8 is a schematic diagram of a diffraction effect of the liquid crystal grating formed by the transparent display device provided according to an embodiment of the present disclosure.

According to an embodiment of the present disclosure, as shown in FIG. 7, it is a schematic structural diagram of the pixel electrode and the formed liquid crystal grating of the transparent display device according to an embodiment of the present disclosure. The plurality of strip electrodes 22 (the pixel electrode) cooperating with the common electrode 21 (not shown in FIG. 7) may be used to form an electric field with a certain direction, to control the liquid crystal molecules to deflect to form the liquid crystal grating 250. An extending direction of the stripes of the liquid crystal grating 250 may be parallel to the extending direction of the strip electrodes 22. The liquid crystal grating 250 can diffract and disperse the collimated light entering the interface of the liquid crystal grating 250, according to the vector matching characteristics of the grating. As shown in FIG. 8, it is a schematic diagram of a diffraction effect of the liquid crystal grating 250 formed by the transparent display device provided according to an embodiment of the present disclosure. A divergence direction of the diffraction is perpendicular to a plane of the strip electrode 22 and points away from the light guide plate 120.

According to an embodiment of the present disclosure, as shown in FIG. 4, the extending direction of the strip electrodes 22 has a certain angle with the rectangle edge of the rectangular light exit 160. The transparent display device may alleviate the problem of the light leakage in the grayscale display in the dark state of the display device while ensuring that the display device has a high transmittance to the ambient light.

According to an embodiment of the present disclosure, the angle between the extending direction of the strip electrodes 22 and the rectangle edge of the rectangular light exit 160 may be greater than 0 degree, and less than or equal to 45 degrees. As a result, the liquid crystal grating 250 formed by the liquid crystal molecules can be controlled, and the light output angle can be adjusted to realize the grayscale display in the bright state.

According to an embodiment of the present disclosure, the light exit 160 may be square, and the extending direction of the strip electrodes 22 may be a direction of a rectangular diagonal of the light exit 160. That is to say, the angle between the extending direction of the strip electrodes 22 and a rectangle edge of the light exit 160 may be 45 degrees. Thereby, light output efficiency can be improved.

Figure 9:
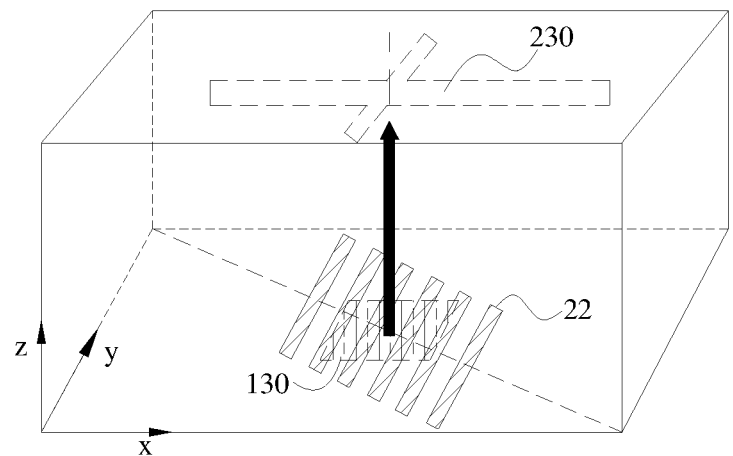
FIG. 9 is yet another schematic structural diagram of the transparent display device provided according to an embodiment of the present disclosure.
Figure 10:
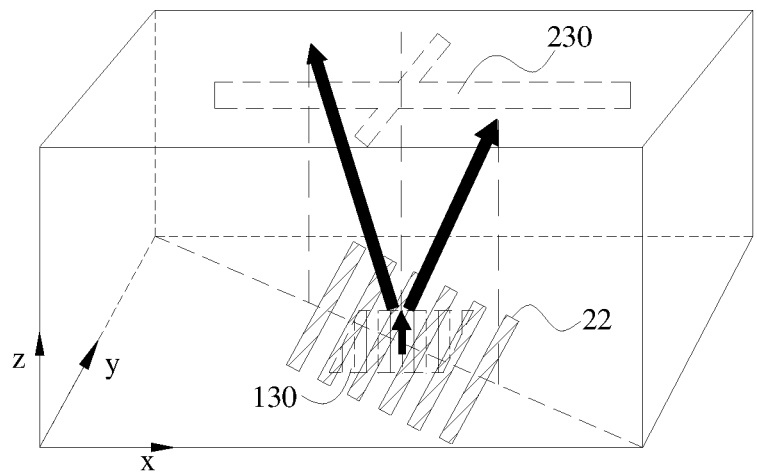
FIG. 10 is still another schematic structural diagram of the transparent display device provided according to an embodiment of the present disclosure.

According to an embodiment of the present disclosure, as shown in FIG. 9, it is a schematic diagram of a partial structure of the transparent display device provided according to an embodiment of the present disclosure. In the dark state display (for example, when the gray scale state is L0), the liquid crystal grating 250 (not shown in FIG. 9) does not work. The light emitted by the light source 110 (not shown in FIG. 9) exits the light guide plate 120 (the x, y plane as shown in FIG. 9) after passing through the light extraction grating 130, passes through the pixel electrode (i.e., the plurality of strip electrodes 22, and their plane is parallel to the x, y plane) above the light guide plate 120, transmits (in the z direction shown in the figure) to a light outgoing side of the display device, and reaches the black matrix 230 on the color filter substrate 260. At this moment, after passing through the light extraction grating 130, the center 0-th order light rays are blocked by the overlapping area between two strip-shaped light-shielding layers, and the surrounding diffracted rays of other orders with smaller energy are blocked by respective extended portions of the two strip-shaped light-shielding layers. Thereby, the problem of the light leakage in the L0 state due to diffraction of small holes can be prevented. While in the bright state display (such as when the gray scale is L255), as shown in FIG. 10, which is another schematic diagram of the partial structure of the transparent display device provided according to an embodiment of the present disclosure, at this time, a voltage may be applied to the pixel electrode (i.e., the plurality of strip electrodes 22) and the common electrode 21 (not shown in FIG. 10), so that the liquid crystal molecules form a liquid crystal grating 250 (not shown in FIG. 10). The collimated light emitted from the light extraction grating 130 passes through the liquid crystal grating 250, and is scattered at a bisector of a right-angle formed by the overlapping of the two strip-shaped light-shielding layers, and is then emitted from sides of the black matrix 230 to realize the bright state display.

According to an embodiment of the present disclosure, as shown in FIG. 5, the liquid crystal unit 200 may further include a pixel black matrix. The pixel black matrix may be disposed on the color filter substrate 260, and may be specifically located on the side of the color filter substrate 260 facing the liquid crystal layer 220. That is, the pixel black matrix may be disposed on a color filter layer of the color filter substrate 260 on the side of the liquid crystal unit 200 away from the light guide plate 120. The pixel black matrix may include a plurality of third strip-shaped light-shielding layers 261 extending in the first direction and a plurality of fourth strip-shaped light-shielding layers 262 extending in the second direction. Any two adjacent third strip-shaped light-shielding layers 261 in the plurality of third strip-shaped light-shielding layers and any two adjacent fourth strip-shaped light-shielding layers 262 in the plurality of fourth strip-shaped light-shielding layers encompass an enclosed area as a sub-pixel area, to form a plurality of sub-pixel areas. Each sub-pixel area of the plurality of sub-pixel areas may include a rectangular display area 11 (e.g., the part enclosed by the dotted frame in FIG. 5), and a transparent area 12 other than the display area 11. The display area 11 corresponds one-to-one with the light exit 160 (not shown in FIG. 5), and an orthographic projection of the display area 11 on the light guide plate 120 at least completely covers a corresponding light exit 160.

According to an embodiment of the present disclosure, the transparent area 12 in the sub-pixel has a certain transmittance to the ambient light, so that a user can see the environment behind it while the display device is displaying. The function of the pixel black matrix is similar to that in a traditional liquid crystal display (LCD) display device. The pixel black matrix can be used to separate pixels to avoid pixel crosstalk. The pixel black matrix can also be used to block circuit wirings, to prevent light from being reflected by the metal wirings and affecting display performance. Each overlapping area of the black matrix 230 may be located in the display area 11 of each sub-pixel. Thus, the performance of the transparent display device may be further improved.

The transparent display device provided according to an embodiment of the present disclosure may also be used to implement color display. The light source 110 may include a plurality of monochromatic light sources, and the plurality of monochromatic light sources may be configured to realize color display of the transparent display device through timing control.

According to an embodiment of the present disclosure, as shown in FIG. 6, the light source 110 may be a monochromatic light source, and one side of the color filter substrate 260 may have a plurality of quantum dot color blocks that can be excited by the monochromatic light source, thereby achieving color display.

According to an embodiment of the present disclosure, the light source 110 may be a blue light source, and colors of the plurality of quantum dot color blocks are not completely the same. For example, the plurality of quantum dot color blocks may include a first quantum dot color block 24 and a second quantum dot color block 25, one of the first quantum dot color block 24 and the second quantum dot color block 25 may be a red quantum dot color block, and the other may be a green quantum dot color block.

According to an embodiment of the present disclosure, in order to reduce a thickness of the transparent display device, the black matrix 230 and the plurality of quantum dot color blocks may be arranged in the same layer. Similarly, the pixel black matrix 26 may be arranged in the same layer as the black matrix 230 and the plurality of quantum dot color blocks. It should be noted that the pixel black matrix 26, the black matrix 230 and the plurality of quantum dot color blocks shown in the figure are only to show their relative positions in the longitudinal section of the transparent display device, and it should not be understood as a limitation to specific arrangement or color selection of the color blocks of the present disclosure.

In addition, an embodiment of the present disclosure provides a method of manufacturing the above-mentioned transparent display device, and the method may include: forming the backlight unit 100, and forming the liquid crystal unit 200 on the light outgoing side of the backlight unit 100.

According to an embodiment of the present disclosure, forming the backlight unit 100 may specifically include: forming the light guide plate 120. The light outgoing side of the light guide plate 120 has at least one rectangular light exit 160, each of the at least one light exit 160 is provided with a light extraction grating 130, and the light extraction grating 130 is configured to extract light in the light guide plate 120.

According to an embodiment of the present disclosure, forming the liquid crystal unit 200 may specifically include: forming the liquid crystal unit 200 on the light outgoing side of the light guide plate 120. The liquid crystal unit 200 may include an electrode layer 210 for controlling the liquid crystal molecules in the liquid crystal layer 220 to form the liquid crystal grating 250, and the black matrix 230 on the side of the liquid crystal layer 220 away from the light guide plate 120. The electrode layer 210 may include the plurality of strip electrodes 22 arranged in parallel. The black matrix 230 may include at least one first strip-shaped light-shielding layer 232 extending in the first direction and at least one second strip-shaped light-shielding layer 231 extending in the second direction. For one light exit 160 of the at least one light exit 160, the arrangement direction of the plurality of strip electrodes 22 is not parallel to the first rectangle edge of the light exit 160 and not parallel to the second rectangle edge of the light exit 160, where the first rectangle edge and the second rectangle edge are perpendicular to each other; and an extension direction of an orthographic projection of one of the at least one first strip-shaped light-shielding layer 232 on the light guide plate 120 is parallel to the first rectangle edge and the orthographic projection of the first strip-shaped light-shielding layer 232 on the light guide plate covers at least a center of the light exit 160, and an extension direction of an orthographic projection of one of the at least one second strip-shaped light-shielding layer 231 on the light guide plate 120 is parallel to the second rectangle edge and the orthographic projection of the second strip-shaped light-shielding layer 231 on the light guide plate covers at least the center of the light exit 160.

According to an embodiment of the present disclosure, the backlight unit 100 includes the light source 110 and the light guide plate 120. The light outgoing side of the light guide plate 120 has the plurality of rectangular light exits 160. Forming the backlight unit 100 may further include providing a light extraction grating 130 at each light exit 160.

According to an embodiment of the present disclosure, when the liquid crystal unit 200 is formed, the shape and position of the black matrix 230 may be controlled, so that the black matrix 230 can block light diffracted by the small hole at the light exit 160. Furthermore, there is an angle between the extending direction of the plurality of strip electrodes 22 in the electrode layer 210 of the liquid crystal unit 200 and a rectangle edge of the rectangular light exit 160. Thereby, a transparent display device with a high transmittance can be easily manufactured, and the problem of the light leakage in the grayscale display in the dark state of the display device can be alleviated.

According to an embodiment of the present disclosure, when the liquid crystal unit 200 is provided on the light outgoing side of the backlight unit 100, the orthographic projection of the overlapping area of the black matrix 230 which is in the liquid crystal unit 200 on the backlight unit 100 is located in the area where the light extraction grating 130 is located.

According to an embodiment of the present disclosure, forming the liquid crystal unit 200 on the light outgoing side of the light guide plate 120 may include: forming the electrode layer 210 on the light outgoing side of the light guide plate 120, where the electrode layer 210 further includes a common electrode 21, and the common electrode 21 is on a side of the plurality of strip electrodes 22 close to the light guide plate 120; forming the liquid crystal layer 22 on a side of the electrode layer 210 away from the light guide plate 120; forming a substrate on a side of the liquid crystal layer 220 away from the light guide plate 120; and forming the black matrix 230 on the substrate via a patterning process.

According to an embodiment of the present disclosure, forming the electrode layer 210 on the light outgoing side of the light guide plate 120 may include: forming the common electrode 21 on the light outgoing side of the light guide plate 120; and depositing a transparent conductive material, such as ITO, on a side of the common electrode 21 away from the light guide plate 120, and etching the transparent conductive material to form the plurality of strip electrodes 22. When etching the ITO, the etching pattern is controlled so that the angle between the extending direction of the strip electrodes 22 and one rectangle edge of the rectangular light exit 160 is greater than 0 degree, and less than or equal to 45 degrees.

According to an embodiment of the present disclosure, the black matrix 230 may be formed on the color filter substrate 260 via a patterning process. That is, the black matrix 230 is formed on the substrate on the side of the liquid crystal unit 200 away from the backlight unit 100.

According to an embodiment of the present disclosure, the pixel black matrix 26 may be formed on the color filter substrate 260 via a patterning process. The pixel black matrix 26 may include a plurality of third strip-shaped light-shielding layers 261 extending in the first direction and a plurality of fourth strip-shaped light-shielding layers 262 extending in the second direction. Any two adjacent third strip-shaped light-shielding layers 261 in the plurality of third strip-shaped light-shielding layers and any two adjacent fourth strip-shaped light-shielding layers 262 in the plurality of fourth strip-shaped light-shielding layers encompass an enclosed area as a sub-pixel area, to form a plurality of sub-pixel areas. Each sub-pixel area of the plurality of sub-pixel areas may include a rectangular display area 11 (e.g., the part enclosed by the dotted frame in FIG. 5), and a transparent area 12 other than the display area 11. The display area 11 corresponds one-to-one with the light exit 160 (not shown in FIG. 5), and an orthographic projection of the display area 11 on the light guide plate 120 at least completely covers a corresponding light exit 160.

An embodiment of the present disclosure further provides a method of controlling the above-mentioned transparent display device, and the method may include steps S1 and S2.

In the step S1, a gray scale state is determined according to a picture to be displayed. The gray scale state may include the darkest state L0 and the brightest state Ln. For example, the brightest state Ln may be L255.

In the step S2, when the gray scale state is L0, the liquid crystal grating 250 does not work; and at this moment, the collimated light emitted from the light extraction grating 130 is blocked by the black matrix 230 to realize the dark state display. When the gray scale state is L255, an appropriate voltage is supplied to the pixel electrode so that the liquid crystal molecules form the liquid crystal grating 250, and there is an angle between the arrangement direction of stripes of the liquid crystal grating 250 and a rectangle edge of the rectangular light exit 160.

The method of controlling the transparent display device provided according to embodiments of the present disclosure may easily use the transparent display device for display, and can alleviate the problem of the light leakage in the darkest gray scale of the display device, thereby improving the display effect.

In the description of the present disclosure, the terms "upper", "lower", etc. indicate the orientation or positional relationship based on the orientation shown in the drawings. They are only for the convenience of describing the present disclosure, and does not require that the present disclosure must be constructed and operated in a specific orientation, and therefore cannot be construed as a limitation to the present disclosure. The terms "first", "second", etc. are only for distinguishing different features, and should not be understood as limiting their importance or number. The description of the terms "one embodiment", "another embodiment" and the like means that the specific features, structures, materials or characteristics described in connection with the embodiment are included in at least one embodiment of the present disclosure. In this specification, the schematic representation of the above terms does not necessarily refer to the same embodiment or example. Moreover, the specific features, structures, materials, or characteristics described may be combined in any suitable manner in any one or more embodiments or examples. In addition, without contradicting each other, those skilled in the art may combine different embodiments or examples and features of different embodiments or examples described in this specification.

Although the embodiments of the present disclosure have been shown and described above, it should be understood that the above-mentioned embodiments are exemplary and cannot be construed as limitations to the present disclosure, and those of ordinary skill in the art may make changes, modifications, substitutions, and variations to the above-described embodiments within the scope of the present disclosure.

The invention claimed is:

1. A transparent display device, comprising a light guide plate and a liquid crystal unit close to a light outgoing side of the light guide plate, wherein:
   the light outgoing side of the light guide plate has at least one rectangular light exit, the at least one light exit is respectively provided with a light extraction grating, and the light extraction grating is configured to extract light in the light guide plate; and the liquid crystal unit comprises an electrode layer for controlling liquid crystal molecules in a liquid crystal layer to form a liquid crystal grating, and a black matrix on a side of the liquid crystal layer away from the light guide plate; wherein the electrode layer comprises a plurality of strip electrodes arranged in parallel, and the black matrix comprises at least one first strip-shaped light-shielding layer extending in a first direction and at least one second strip-shaped light-shielding layer extending in a second direction;

wherein for one light exit of the at least one light exit, an arrangement direction of the plurality of strip electrodes is not parallel to a first rectangle edge of the light exit and not parallel to a second rectangle edge of the light exit, wherein the first rectangle edge and the second rectangle edge are perpendicular to each other; and an extension direction of an orthographic projection of one of the at least one first strip-shaped light-shielding layer on the light guide plate is parallel to the first rectangle edge and the orthographic projection of the first strip-shaped light-shielding layer on the light guide plate covers at least a center of the light exit, and an extension direction of an orthographic projection of one of the at least one second strip-shaped light-shielding layer on the light guide plate is parallel to the second rectangle edge and the orthographic projection of the second strip-shaped light-shielding layer on the light guide plate covers at least the center of the light exit.

2. The transparent display device of claim 1, wherein:
a width of the first strip-shaped light-shielding layer in the second direction is greater than or equal to a set first threshold, and less than or equal to a set second threshold; wherein the set first threshold is less than or equal to a length of the second rectangle edge, and the set second threshold is greater than or equal to the length of the second rectangle edge; and/or a width of the second strip-shaped light-shielding layer in the first direction is greater than or equal to a set third threshold, and less than or equal to a set fourth threshold; wherein the set third threshold is less than or equal to a length of the first rectangle edge, and the set fourth threshold is greater than or equal to the length of the first rectangle edge; and/or a length of the first strip-shaped light-shielding layer in the first direction is greater than or equal to the length of the first rectangle edge; and/or a length of the second strip-shaped light-shielding layer in the second direction is greater than or equal to the length of the second rectangle edge.

3. The transparent display device of claim 1, wherein the first strip-shaped light-shielding layer overlaps with the second strip-shaped light-shielding layer, and an orthographic projection on the light guide plate of an overlapping area of the first strip-shaped light-shielding layer and the second strip-shaped light-shielding layer coincides with an orthographic projection of the light exit on the light guide plate.

4. The transparent display device of claim 1, wherein the light exit is square, and the arrangement direction of the plurality of strip electrodes is parallel or perpendicular to an angle bisector between the first rectangle edge and the second rectangle edge.

5. The transparent display device of claim 1, wherein the electrode layer further comprises a common electrode, wherein the common electrode and the plurality of strip electrodes are on a side of the liquid crystal layer close to the light guide plate, and the common electrode is on a side of the plurality of strip electrodes close to the light guide plate.

6. The transparent display device of claim 1, wherein a substrate on a side of the liquid crystal unit away from the light guide plate has a color film layer, and the black matrix and a pixel black matrix are on the color film layer.

7. The transparent display device of claim 6, wherein:
the pixel black matrix comprises a plurality of third strip-shaped light-shielding layers extending in the first direction and a plurality of fourth strip-shaped light-shielding layers extending in the second direction; wherein any two adjacent third strip-shaped light-shielding layers in the plurality of third strip-shaped light-shielding layers and any two adjacent fourth strip-shaped light-shielding layers in the plurality of fourth strip-shaped light-shielding layers encompass an enclosed area as a sub-pixel area, to form a plurality of sub-pixel areas;

each sub-pixel area of the plurality of sub-pixel areas comprises a rectangular display area, and a transparent area other than the display area; and the at least one light exit is respectively located in ranges of orthographic projections of respective display areas on the light guide plate.

8. The transparent display device of claim 6, further comprising a light source, wherein the light source is a side-entry light source.

9. The transparent display device of claim 8, wherein the light source comprises a plurality of monochromatic light sources configured to realize color display of the transparent display device through timing control.

10. The transparent display device of claim 9, wherein the light source comprises a blue light source, and the color film layer has a plurality of quantum dot color blocks that can be excited by the blue light source, and colors of the plurality of quantum dot color blocks are not completely a same.

11. The transparent display device of claim 8, further comprising a collimating lampshade configured such that light emitted by the light source enters the light guide plate at a set incident angle, wherein the set incident angle makes the light emitted by the light source totally reflected in the light guide plate.

12. The transparent display device of claim 1, further comprising a low-refractive layer covering a surface of the light guide plate having the at least one light exit.

13. A method of manufacturing a transparent display device, comprising:
forming a light guide plate; wherein a light outgoing side of the light guide plate has at least one rectangular light exit, the at least one light exit is respectively provided with a light extraction grating, and the light extraction grating is configured to extract light in the light guide plate; and forming a liquid crystal unit on the light outgoing side of the light guide plate;

wherein the liquid crystal unit comprises an electrode layer for controlling liquid crystal molecules in a liquid crystal layer to form a liquid crystal grating, and a black matrix on a side of the liquid crystal layer away from the light guide plate; wherein the electrode layer comprises a plurality of strip electrodes arranged in parallel, and the black matrix comprises at least one first strip-shaped light-shielding layer extending in a first direction and at least one second strip-shaped light-shielding layer extending in a second direction;

for one light exit of the at least one light exit, an arrangement direction of the plurality of strip electrodes is not parallel to a first rectangle edge of the light exit and not parallel to a second rectangle edge of the light exit, wherein the first rectangle edge and the second rectangle edge are perpendicular to each other; and an extension direction of an orthographic projection of one of the at least one first strip-shaped light-shielding layer on the light guide plate is parallel to the first rectangle edge and the orthographic projection of the first strip-shaped light-shielding layer on the light guide plate covers at least a center of the light exit, and an extension direction of an orthographic projection of one of the at least one second strip-shaped light-shielding layer on the light guide plate is parallel to the second rectangle edge and the orthographic projection of the second strip-shaped light-shielding layer on the light guide plate covers at least the center of the light exit.

14. The method of claim 13, wherein:
a width of the first strip-shaped light-shielding layer in the second direction is greater than or equal to a set first threshold, and less than or equal to a set second threshold; wherein the set first threshold is less than or equal to a length of the second rectangle edge, and the set second threshold is greater than or equal to the length of the second rectangle edge; and/or
a width of the second strip-shaped light-shielding layer in the first direction is greater than or equal to a set third threshold, and less than or equal to a set fourth threshold; wherein the set third threshold is less than or equal to a length of the first rectangle edge, and the set fourth threshold is greater than or equal to the length of the first rectangle edge; and/or
a length of the first strip-shaped light-shielding layer in the first direction is greater than or equal to the length of the first rectangle edge; and/or
a length of the second strip-shaped light-shielding layer in the second direction is greater than or equal to the length of the second rectangle edge.

15. The method of claim 13, wherein the first strip-shaped light-shielding layer overlaps with the second strip-shaped light-shielding layer, and an orthographic projection on the light guide plate of an overlapping area of the first strip-shaped light-shielding layer and the second strip-shaped light-shielding layer coincides with an orthographic projection of the light exit on the light guide plate.

16. The method of claim 13, wherein the light exit is square, and the arrangement direction of the plurality of strip electrodes is parallel or perpendicular to an angle bisector between the first rectangle edge and the second rectangle edge.

17. The method of claim 13, wherein forming the liquid crystal unit on the light outgoing side of the light guide plate comprises:
forming the electrode layer on the light outgoing side of the light guide plate, wherein the electrode layer further comprises a common electrode, and the common electrode is on a side of the plurality of strip electrodes close to the light guide plate;
forming the liquid crystal layer on a side of the electrode layer away from the light guide plate;
forming a substrate on a side of the liquid crystal layer away from the light guide plate; and
forming the black matrix on the substrate via a patterning process.

18. The method of claim 17, wherein forming the electrode layer on the light outgoing side of the light guide plate comprises:
forming the common electrode on the light outgoing side of the light guide plate; and
depositing a transparent conductive material on a side of the common electrode away from the light guide plate, and etching the transparent conductive material to form the plurality of strip electrodes.

19. The method of claim 17, wherein forming the liquid crystal unit on the light outgoing side of the light guide plate comprises:
forming a pixel black matrix on the substrate via a patterning process;
wherein the pixel black matrix comprises a plurality of third strip-shaped light-shielding layers extending in the first direction and a plurality of fourth strip-shaped light-shielding layers extending in the second direction; wherein any two adjacent third strip-shaped light-shielding layers in the plurality of third strip-shaped light-shielding layers and any two adjacent fourth strip-shaped light-shielding layers in the plurality of fourth strip-shaped light-shielding layers encompass an enclosed area as a sub-pixel area, to form a plurality of sub-pixel areas;
each sub-pixel area of the plurality of sub-pixel areas comprises a rectangular display area, and a transparent area other than the display area; and
the at least one light exit is respectively located in ranges of orthographic projections of respective display areas on the light guide plate.

20. A method of controlling the transparent display device of claim 1, comprising:
determining a gray scale state according to a picture to be displayed, wherein the gray scale state comprises a darkest state L0 and a brightest state Ln; and
supplying a set voltage to the plurality of strip electrodes, in response to determining that the gray scale state is the Ln, so that the liquid crystal molecules in the liquid crystal layer form the liquid crystal grating, and an arrangement direction of stripes of the liquid crystal grating is not parallel to the first rectangle edge of the light exit and not parallel to the second rectangle edge of the light exit;
supplying no voltage to the plurality of strip electrodes, in response to determining that the gray scale state is the L0.

* * * * *